United States Patent [19]
Staber et al.

[11] Patent Number: 6,026,160
[45] Date of Patent: Feb. 15, 2000

[54] XDSL SPLITTER INTERCONNECT MODULE FOR NETWORK INTERFACE DEVICE

[75] Inventors: Harley J. Staber, Coppell; Todd C. Lanquist, Trophy Club; John A. Keenum, Keller, all of Tex.

[73] Assignee: Siecor Operations, LLC, Hickory, N.C.

[21] Appl. No.: 09/001,678

[22] Filed: Dec. 31, 1997

[51] Int. Cl.[7] .................................................. H04M 1/00
[52] U.S. Cl. ............................................................ 379/399
[58] Field of Search .................................... 379/399, 326, 379/327, 328; 361/56, 119, 91, 356

[56] References Cited

U.S. PATENT DOCUMENTS

| | | | |
|---|---|---|---|
| 4,910,770 | 3/1990 | Collins et al. | 379/399 |
| 5,408,260 | 4/1995 | Arnon | 348/6 |
| 5,440,335 | 8/1995 | Beveridge | 348/13 |
| 5,469,495 | 11/1995 | Beveridge | 379/56 |

OTHER PUBLICATIONS

A1000 ADSL Remote Splitter (LDFR) Installation (with Guidelines for In–home Wiring); Alcatel Telecom; A9693; 3EC 15158 AAAA TCZZA–Ed. 01, Dec. 1997.

*Primary Examiner*—Jack Chiang

[57] ABSTRACT

The present invention provides a splitter module with an xDSL splitter circuit that is removably installable in a network interface device (NID) and interconnectable with a POTS module in the NID to split the POTS and xDSL signal onto separate inside wire pairs terminated in the NID. The splitter module has a jack and a plug. The plug from the POTS module is inserted in the jack on the splitter module and the plug on the splitter module is then inserted into the jack on the POTS module. This exchange of plugs and jacks place a splitter circuit between the outside plant wiring and the pairs of inside wiring.

20 Claims, 5 Drawing Sheets

XDSL SPLITTER INTERCONNECT MODULE FOR NETWORK INTERFACE DEVICE

BACKGROUND OF THE INVENTION

ADSL (Asymmetric Digital Subscriber Line) is a modem technology that transmits multimedia and high speed data over existing twisted-pair telephones lines concurrently with Plain Old Telephone Service (POTS) signals. VDSL is a higher speed variation of ADSL. The multimedia and high speed data are at a higher frequency than the POTS signals, and components have been developed that can split the higher frequency multimedia and/or data from the lower frequency POTS signal at either end of the transmission path. IDSL is a variation wherein the multimedia and/or high speed data is transmitted concurrently with an ISDN signal instead of the POTS signal. The ISDN, while a higher frequency than the POTS signal, is lower than the multimedia or high speed data signal. Other variations may exist or be developed where signals of differing frequencies are transmitted over existing twisted-pair wiring to a subscriber. The term xDSL will be used herein to generically refer to these different versions of transmitting higher frequency signals (e.g. ADSL, VDSL) over twisted pair concurrently with a relatively lower frequency signal (e.g., POTS, ISDN, or out-of-band signaling used in special services). The terms "first signal" and "second signal" will be used herein to generically refer to at least two different frequency signals transmitted concurrently over twisted-pair wiring and that are intended to be separated, or split, at the subscriber. The term "combined signals" will be used to refer to both the first and second signals combined over a line.

An xDSL architecture connects an xDSL modem on each end of a twisted-pair telephone line, that is, at the "central office" (or node or remote terminal) and at the premises of the subscriber (or customer). The terms "splitting" or "splitter" are used to refer to a circuit or component, for example, a low pass filter or low pass and high pass filter combination, that separates the first signal from a combined signal, in the example of a low pass filter, and that separates both the first and second signals from the combined signal in the example of the low pass and high pass filter combination. Components other than low pass and high pass filters may exist or be developed that also perform this splitting function. The structure and nature of the various splitter circuits or components form no part of the present invention other than the fact that they "split" the combined signal and must be interconnected into an XDSL network in some manner at the customer end of the network.

Splitters have typically been housed with the XDSL modems. However, in view of the requirement for a demarcation point for at least the POTS signal at the network interface device (NID) at the subscriber, some architectural issues arise on how to accommodate the XDSL signal in the existing subscriber interface architecture. U.S. Pat. Nos. 4,488,008; 4,741,032; 5,355,408; and 5,414,765 show various examples of NIDs in use today where POTS modules with a demarcation point are removably mounted in the NID A splitter sold by Alcatel under the designation "A1000 ADSL Remote Splitter" is disclosed as being installed in a NID, however, the Alcatel product suffers from potential drawbacks. First, the installation of the Alcatel splitter requires that the inside wiring be disconnected from the subscriber terminals of one of the POTS modules mounted in the NID and connected to the splitter. Then wires from the splitter are installed to the subscriber terminals on the POTS module. This removal of wiring and rewiring can be a cumbersome process and significantly increases the potential for a wiring mistake on installation. This is especially so considering that POTS modules were designed with a demarcation point that eliminated the need for the subscriber to disconnect any terminal wiring. Secondly, the Alcatel splitter does not provide a separate demarcation point for the POTS-only signal or for the xDSL-only signal. Because the splitter is placed between the demarcation point and the inside wiring, the combined signal passes through the demarcation point (the RJ-11 jack and plug) thereby preventing the ability to have a demarcation point for each isolated signal. Also, the Alcatel splitter takes up four line module spaces in a six line NID. This eliminates its use in NIDs of less than 5 lines or NIDs without four consecutive line module spaces available. Additionally, the Alcatel splitter mounts to an adapter plate that flexes a mounting tang with a projection in the NID as it is snapped into place in the NID by the customer with the telco door closed. Flexing of the mounting tang with the telco door closed is not the intended manner of use of the mounting tang which is meant to flexibly receive POTS modules therein with the telco door open. While insertion is possible while the telco door is closed due to the ramping on the top of the projection on the mounting tang, removal of the adapter plate is not practical without opening the telco door because the tang cannot be readily flexed to clear the projection from the adapter plate. As with the POTS module, ready removal of the adapter plate from the NID requires flexing of the tang that can only be sufficiently flexed when the telco door is open. Because customers do not have the authority to open the telco door, a customer will not be able to practically remove the Alcatel splitter adapter from the NID and may need to place a service call to remove the splitter adapter.

Accordingly, a need exists for an XDSL splitter module for use in the NID that overcomes one or more of the above discussed drawbacks.

SUMMARY OF THE INVENTION

The present invention provides an improved apparatus for accommodating the xDSL splitter in existing Network Interface Devices (NIDs). One aspect of the present invention provides a network interface device (ND) with a point of demarcation for xDSL and POTS signals between an outside plant pair of wires and a first and second pair of inside wires. The NID comprises a housing having an interior and at least one door that closes over the interior. The interior has a first compartment that is accessible by at least the subscriber and a second compartment to which access by the subscriber is not intended. The first compartment has a plurality of mounting locations with the same configurations. A POTS module is removably mounted in the housing at a first mounting location of the plurality of mounting locations. The POTS module comprises a first pair of terminals for having the outside plant pair of wires connected thereto, a second pair of terminals for having the first pair of inside wires connected thereto, a first jack electrically connected to the first pair of terminals, and a first plug electrically connected to the second pair of terminals. A splitter module is removably mounted in the housing at a second mounting location of the plurality of mounting locations. The splitter module comprises a second plug that is removably inserted into the first jack, a second jack having the first plug removably inserted therein, and a first splitter circuit located in series between the second plug and second jack that is designed to pass only the POTS signal from the second plug to the second jack.

Another aspect of the present invention provides a method of providing a point of demarcation for xDSL signals and POTS signals between an outside plant pair of wires and first and second pair of inside subscriber wires in a network interface device (ND) that has at least one POTS module in a first mounting location of a plurality of mounting locations. The POTS module has a first pair of terminals connected to the outside plant pair of wires, a second pair of terminals connected to the first pair of inside wires, and a demarcation point of a first jack with a first plug inserted therein located in series between the first pair of terminals and the second pair of terminals. The method comprises the steps of removably mounting a splitter module at a second of the plurality of mounting locations. The splitter module has a second plug, a second jack and a first splitter circuit located in series between the second plug and the second jack that is designed to pass only the POTS signal from the second plug to the second jack. The first plug is removed from the first jack and inserted in the second jack. The second plug is inserted in the first jack.

Another aspect of the present invention provides a splitter module for installation in a network interface device (NED) that has at least one POTS module in a first mounting location of a plurality of mounting locations The POTS module has a first pair of terminals, a second pair of terminals, and a demarcation point of a first jack with a first plug inserted therein located in series between the first pair of terminals and the second pair of terminals. The splitter module comprises a housing with an outer configuration for being removably mountable at one of the plurality of mounting locations. A second plug flexibly extends from the housing such that when the housing is mounted in a mounting location adjacent the first mounting location, the second plug can be inserted into the first jack after the first plug is removed. A second jack is located on the housing such that when the housing is mounted in a mounting location adjacent the first mounting location, the first plug can be removed from the first jack and inserted into the second jack. A first splitter circuit is located in series between the second plug and the second jack, the first splitter circuit designed to pass only the POTS signal from the second plug to the second jack.

DETAILED DESCRIPTION OF THE PREFERRED EMBODIMENT

Figure 1:
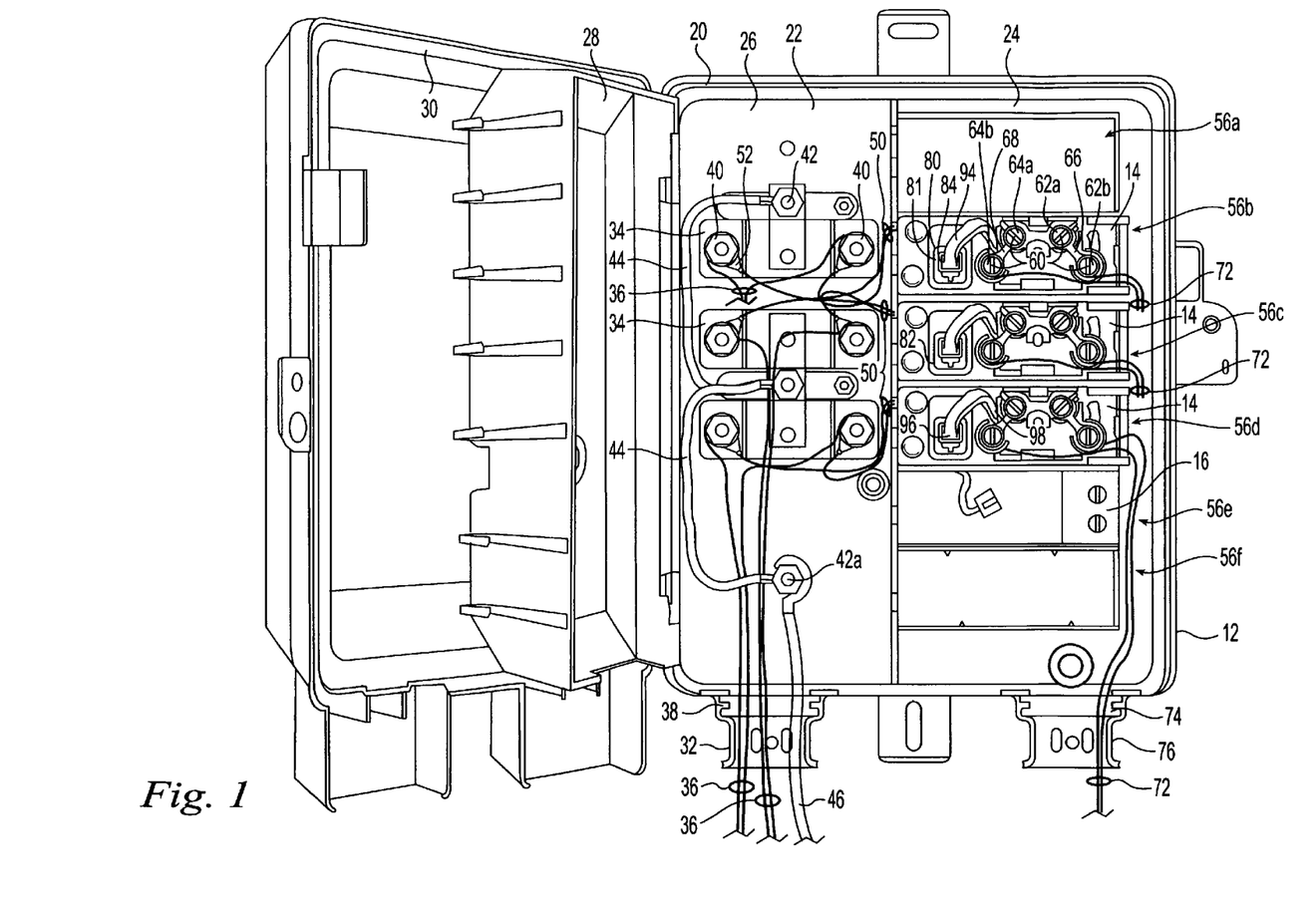
FIG. 1 is a front view of a network interface device for use with the present invention with its inner and outer doors in the opened position.

With reference to FIG. 1, an example of a network interface device (NID) 12 is shown that is used with the present invention. NID 12 has a plurality of POTS modules 14 removably mounted therein. Various types of NIDs with one or more POTS modules are known in the art, and the present invention is not limited to a specific NID or POTS module design. The NID and POTS modules 14 depicted in FIG. 1 are combined in a CAC 7600 available from Siecor Corporation. NID 12 has housing 20 with interior 22 that is divided into subscriber compartment 24 and telephone company (telco) compartment 26. Inner door 28 closes over telco compartment 26 and prevents removal of POTS modules 14 from NED 12. Outer door 30 closes over inner door 28 and subscriber compartment 24, onto housing 20, and the subscriber is able to open outer door 30 to access subscriber compartment 24.

Housing 20 defines first port 32 entering into telco compartment 26. A plurality of protectors 34 are mounted in telco compartment 26. Outside plant wire pairs 36 are routed into first port 32, through first grommet 38 and terminated at a respective pair of protector terminals 40 as is well known in the art. Each protector 34 has a surge protector element that shorts to ground in response to a certain threshold surge over its respective outside plant wire pair 36. Ground terminals 42 of each protector are connected together by wires 44, and the bottom ground terminal 42a is connected to earth ground wire 46 that is routed out of housing 12 to be joined to earth ground as is known. Other variations of how the protectors are arranged and connected are common, including the PTD NID available from Siecor that houses the surge protector element in the POTS module. U.S. Pat. Nos. 5,153,910; 5,333,193; 5,416,837; 5,479,505; 5,548,641 and other related patents (collectively, the PTD patents) disclose the structure and operation of the PTD NID and PTD POTS modules. Because the PTD POTS module contains the protector element, the outside plant wire pairs are routed directly to terminals on the PTD POTS module. In contrast, in FIG. 1, outside plant wire pairs 36 are connected to POTS modules 14 by being connected to protector terminals 40 to which leads 50 of POTS modules 14 are connected. Leads 50 of POTS modules 14 have outside plant terminals 52 which are connected to protector terminals 40 and thereby connected to outside plant wire pairs 36.

Each POTS module 14 is mounted in a respective mounting location 56b–d. Mounting locations 56a and 56f are empty and mounting location 56e receives splitter module 16 of the present invention as will be described in more detail below with reference to other Figures. Mounting locations 56 have structure for removable mounting of POTS modules 14 thereto as will be discussed in further detail below. POTS modules have two pairs of subscriber terminals 60. Each pair has a ring terminal 62 and a tip terminal 64 and the ring terminals 62a, b are connected together by first conductor 66 and tip terminals 64a, b are connected together by second conductor 68. One subscriber ring terminal and one subscriber tip terminal may be adequate, however, certain telephone companies require an extra pair of subscriber terminals. Inside wire pairs 72 are connected to subscriber terminals 60 and routed outside of NID 12 through second grommet 74 and second port 76 as is well known.

Connected in series between outside plant terminals 52 and subscriber terminals 60 is demarcation point 80 which is shown as first jack 82 with first plug 84 inserted therein. First jack 82 is wired to outside plant terminals 52 and first plug 84 is wired to subscriber terminals 60. When first plug 84 is disconnected from first jack 82, the inside wiring 72 is disconnected from the outside plant wiring. This demarcation point serves at least two main purposes: (1) to provide a test point for the subscriber to determine whether a POTS signal malfunction is a result of something between the NID and the subscriber's phone or something beyond the NID such that it would be a telephone company problem, and (2) to remove the inside wiring from being in electrical contact with the outside plant wiring for safety concerns during repair or installation of inside wiring. First plug 84 and first jack 82 are the commonly used RJ-11 telephone plug and jack where first plug has a free end for insertion into first jack 82 to make an electrical connection. First plug 84 has a back end from which extends line cord 94. Line cord 94 has first end 96 connected to first plug 84 and second end 98 opposite thereto and connected to subscriber terminals 60. Line cord 94 is of sufficient length to allow first plug 84 to be removed from first jack 82 and placed out of the way to allow a test plug to then be inserted into first jack 82. Preferably, the interface between first jack 82 and first plug 84 is sealed in some manner, for example, by a boot 81 on the plug containing gel as disclosed in U.S. Pat. No. 5,595,504.

Figure 7:
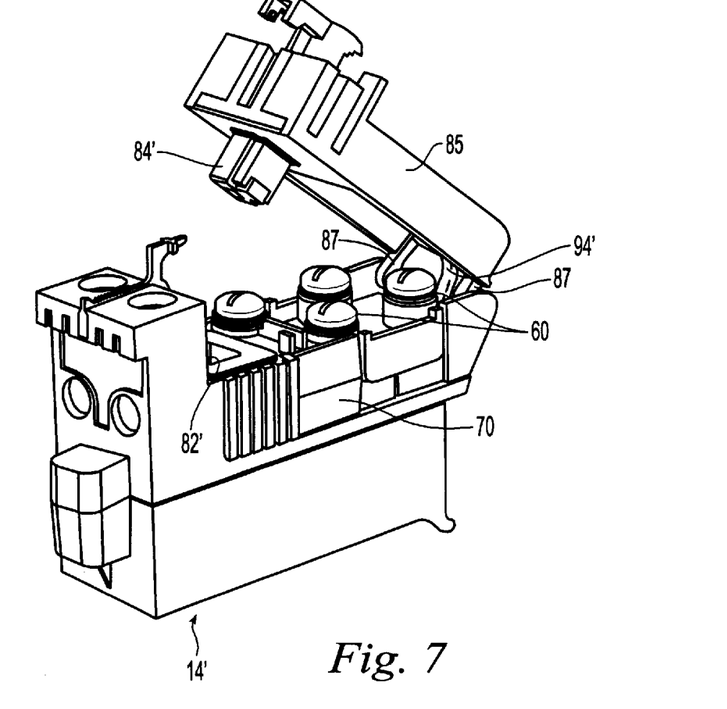
FIG. 7 is an alternative embodiment of a POTS module with which a splitter module according to the present invention could also be used.

With reference to FIG. 7, POTS module 14' is shown which is a PTD module of the PTD patents referenced above. POTS module 14' has first plug 84' contained in door 85 that is hinged to POTS module 14'. When door 85 is closed, first plug 84' resides in first jack 82', and when door 85 is opened a test plug can then be inserted into first jack 82'. Line cord 94' has a first end connected to the back of the first plug and a second end connected to subscriber terminals 60'. In this particular design, the first plug is not readily separable from door 85; however, door 85 is readily snapped off of POTS module 14' at hooks 87. Additionally, subscriber bridge 70 is snap fit to POTS module 14' and is readily removable as shown in the PTD patents as a unit comprising subscriber terminals 60', door 85 and line cord 94'. First jack 82' remains on POTS module 14'.

Other variations of a demarcation point are known, such as having a jack and shunt plug arrangement where the subscriber terminals are wired to other contacts in the jack, and the plug shunts the outside plant contacts to the subscriber contacts. Another alternative is a design where the demarcation point is out of circuit during normal operation and then physically switched into the circuit when needed, for example, U.S. Pat. No. 5,414,765.

Because the demarcation point must be accessible by the subscriber, it must be accessible in subscriber compartment 24. Yet, the telephone company owns POTS modules 14 and requires some means to prevent their removal from NID 12. Therefore, a common NID design is to locate the POTS modules in subscriber compartment 24 so that demarcation point 80 is accessible but have inner door 28 prevent removal of POTS modules 14 when inner door is closed. Also, inner door 28 covers protectors 34 to prevent access to the protectors by subscribers. Inner door 28 typically can only be opened by a special tool that subscribers do not typically possess thereby effectively preventing subscriber removal of the POTS modules and preventing access to telco compartment 26. The other commonly used NIDs have other door arrangements to similarly prevent removal of a line module from the NID while still providing access to the test jack on the line module.

Figure 2:
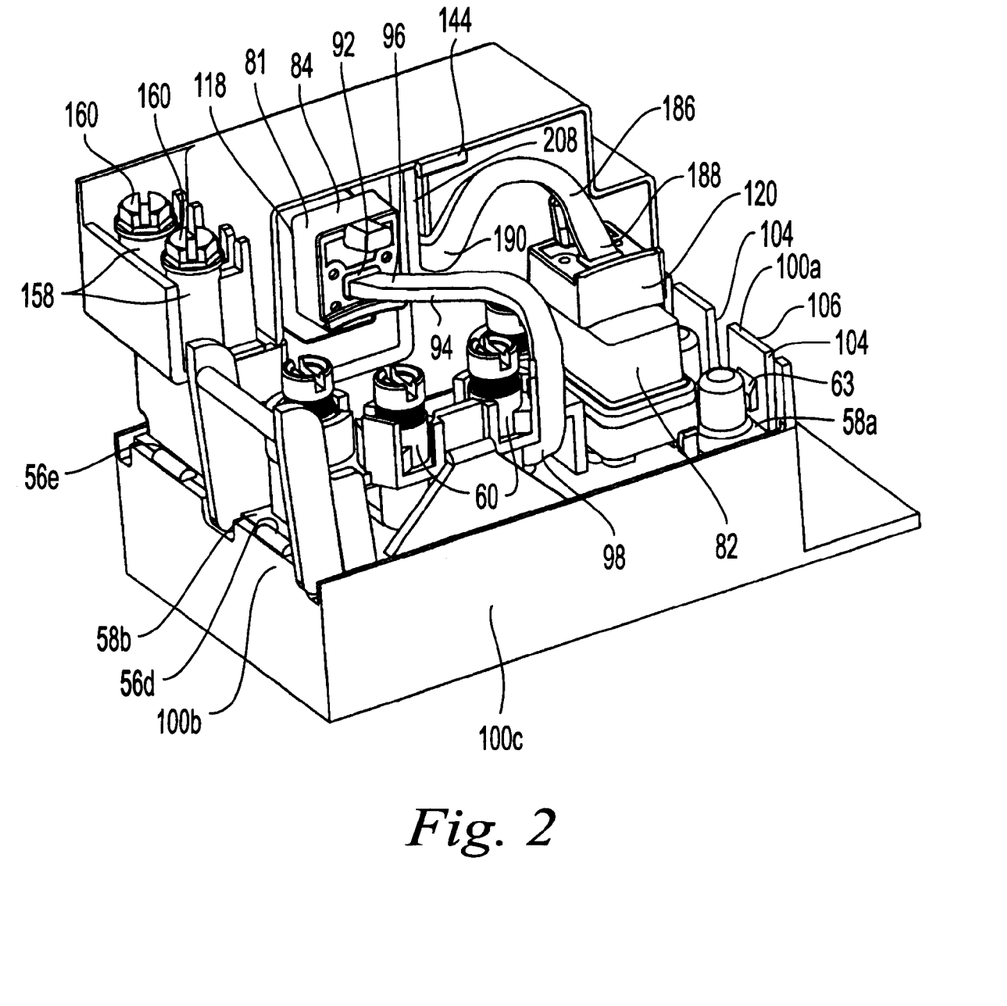
FIG. 2 is a perspective view of a preferred embodiment of the splitter module of the present invention interconnected with a POTS module.

With reference to FIGS. 1–2 and 4–5, the mounting interface between POTS modules 14 and the mounting locations in the NIDs will be described. Each mounting location 56 of NID 12 has vertical walls 100*a–d*. Walls 100*a* and 100*b* are opposite each other and have projection 102*a, b* respectively. Wall 100*a* has two vertical slots 104 on each side of projection 102*a* so as to define tang 106 which is slightly flexible. With reference to FIGS. 1 and 2, POTS module 14 has first edge 58*a* and second edge 58*b* opposite thereto by a length approximately that between walls 100*a* and 100*b* such that edges 58*a, b* snap underneath projections 102*a, b*, respectively. Projection 102*a* has ramp surface 103 along which edge 58*a* slides and flexes tang 106 outward. After edge 58*a* clears projection 102*a*, tang 106 flexes back to a vertical position such that projection 102*a* is disposed over edge 58*a*. Walls 100*c, d* have ribs 108 on which POTS module 14 is disposed upon being snapped into mounting location 56. Inner door 28 has free side 29 that is disposed adjacent tangs 106 when inner door 28 is closed so as to prevent tangs 106 from being flexed outward. Wall 100*b* is not flexible outward, therefore, edges 58*a, b* are confined underneath projections 102*a, b*, respectively when inner door 28 is closed. As such, when inner door 28 is closed and locked by a telco-access-only bolt or lock, POTS modules 14 are effectively locked in place such that a subscriber cannot remove them from NID 12.

NIDs and POTS modules as discussed above are known. The present invention provides a splitter module that can be readily installed into NID 12 and interconnected with an existing POTS module 14, or an ISDN module or other module providing a demarcation point for a lower signal, so as to effectively locate an XDSL splitter physically in the NED and electrically between a first wire pair, e.g. an outside plant wire pair, and a second and third wire pair, e.g. two inside wiring pairs, to provide a demarcation point for one or more of the combined signal, lower signal and higher signal.

With reference to FIGS. 2–4 and 6, a preferred embodiment of splitter module 16 of the present invention is shown with housing 110 that defines interior 112 that receives splitter circuit card 114 and is closed by cover 116 which has second jack 118 and second plug 120. Housing 110 has generally five walls joined together to define interior 112: bottom wall 124, first end wall 126 and second end wall 128 opposite each other and extending generally perpendicular from bottom wall 124, top wall 130 opposite bottom wall 124 extending from first end wall 126 to second end wall 128, and side wall 132 spanning across these walls to close one side of the housing designated as closed side 134. Open side 136 of housing 110 is opposite closed side 134. Periphery 138 of housing 110 around open side 136 defines shoulder 140 recessed from edge 142 Three projections 144 extend from edge 142 over shoulder 140 so as to receive the edges of cover 116 snap fit therebetween.

Figure 4:
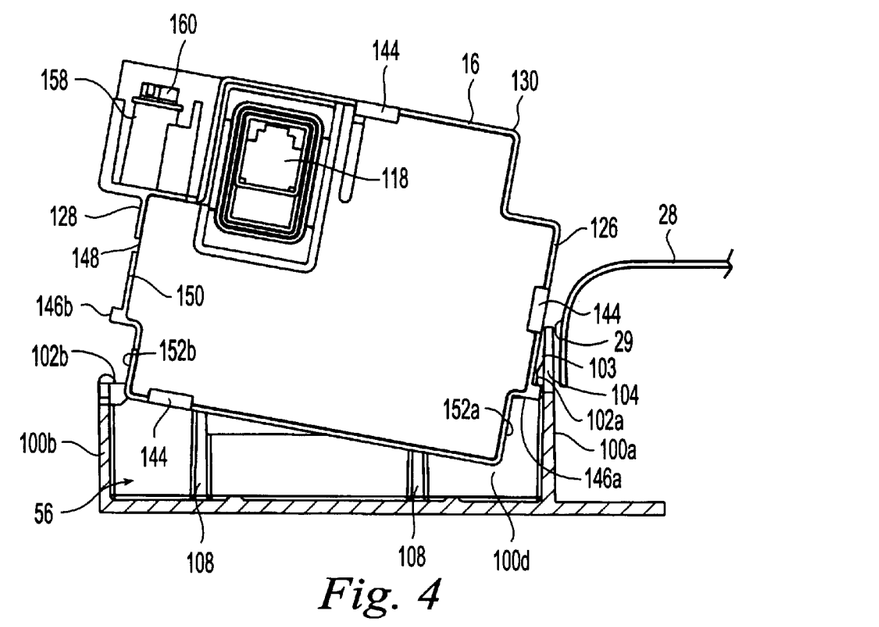
FIG. 4 is a side view of the preferred embodiment of the splitter module of the present invention being removed from its mounting location.

Bottom wall 124 is sized to be received in a mounting location 56. First end wall 126 has first ledge 146*a* for snapping underneath first projection 102*a*, and second end wall 128 has second ledge 146*b* for being disposed underneath second projection 102*b*. In order to allow the subscriber to remove splitter module 16 after its installation in the application where the subscriber owns the splitter module, second wall 128 defines cut out 148 which creates flexible arm 150 with second ledge 146*b*. Arm 150 is deflectable into interior 112 by a finger until second ledge 146*b* clears second projection 102*b* allowing splitter module 16 to be slightly rotated and then lifted out of mounting location 56 even when inner door 28 is closed and locking POTS modules 14 in their respective mounting locations. FIG. 4 shows an exaggerated rotation of splitter module 16. First and second end walls 126, 128 have recessed portions 152*a, b*, respectively, below ledges 146*a, b*, respectively, to prevent any interference between end walls 126, 128 and walls 100*a, b*, respectively, of mounting location 56 upon insertion and removal of splitter module 16 from mounting location 56.

Figure 5:
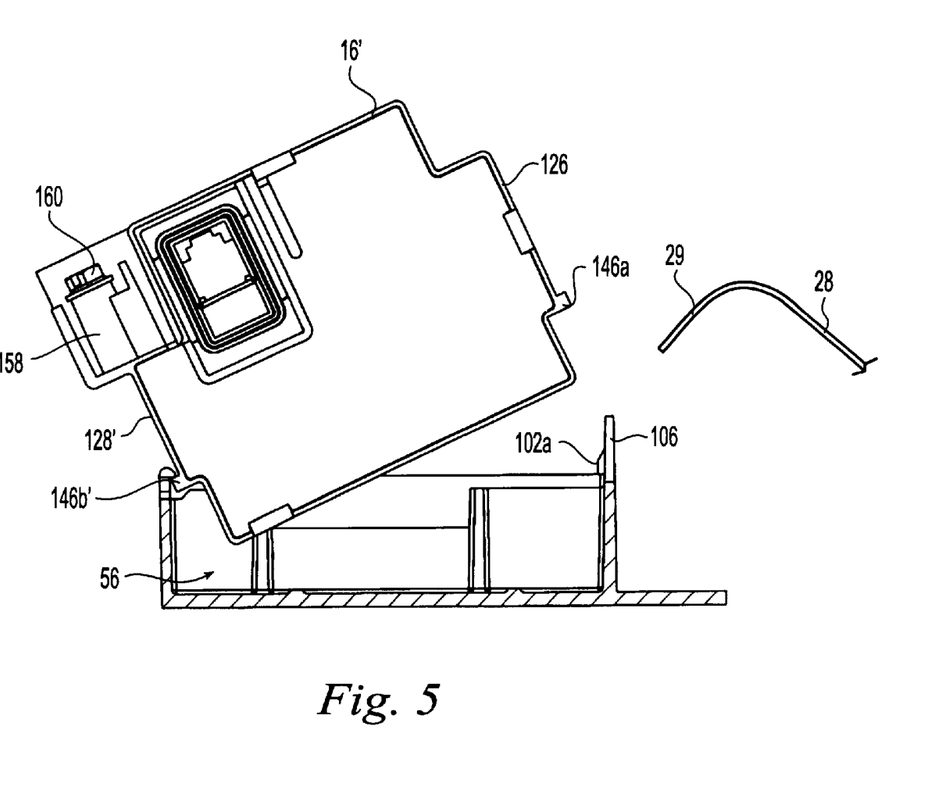
FIG. 5 is a side view of an alternative embodiment of the splitter module of the present invention being removed from its mounting location.

FIG. 5 shows an alternative embodiment where splitter module 16' is not removable from mounting location 56 when inner door 28 is closed for the application where the telephone company owns the splitter module. Splitter module 16' has second end wall 128' that is continuous from the side wall to the open side at second ledge 146b' so that second ledge 146b' can not be deflected by a finger to clear second projection 102b. Similarly, first end wall 126 is continuous from the side wall to the open side at first ledge 146a so that it is not deflectable. When inner door 28 of NID 12 is closed, tang 106 cannot be deflected away from first end wall 126 and as such ledges 146a,b are retained underneath projections 102 a, b, respectively, to effectively prevent removal of splitter module 16'. Once inner door 28 is opened, splitter module 16' can then be removed by deflection of tang 106 as with the POTS module.

Figure 3:
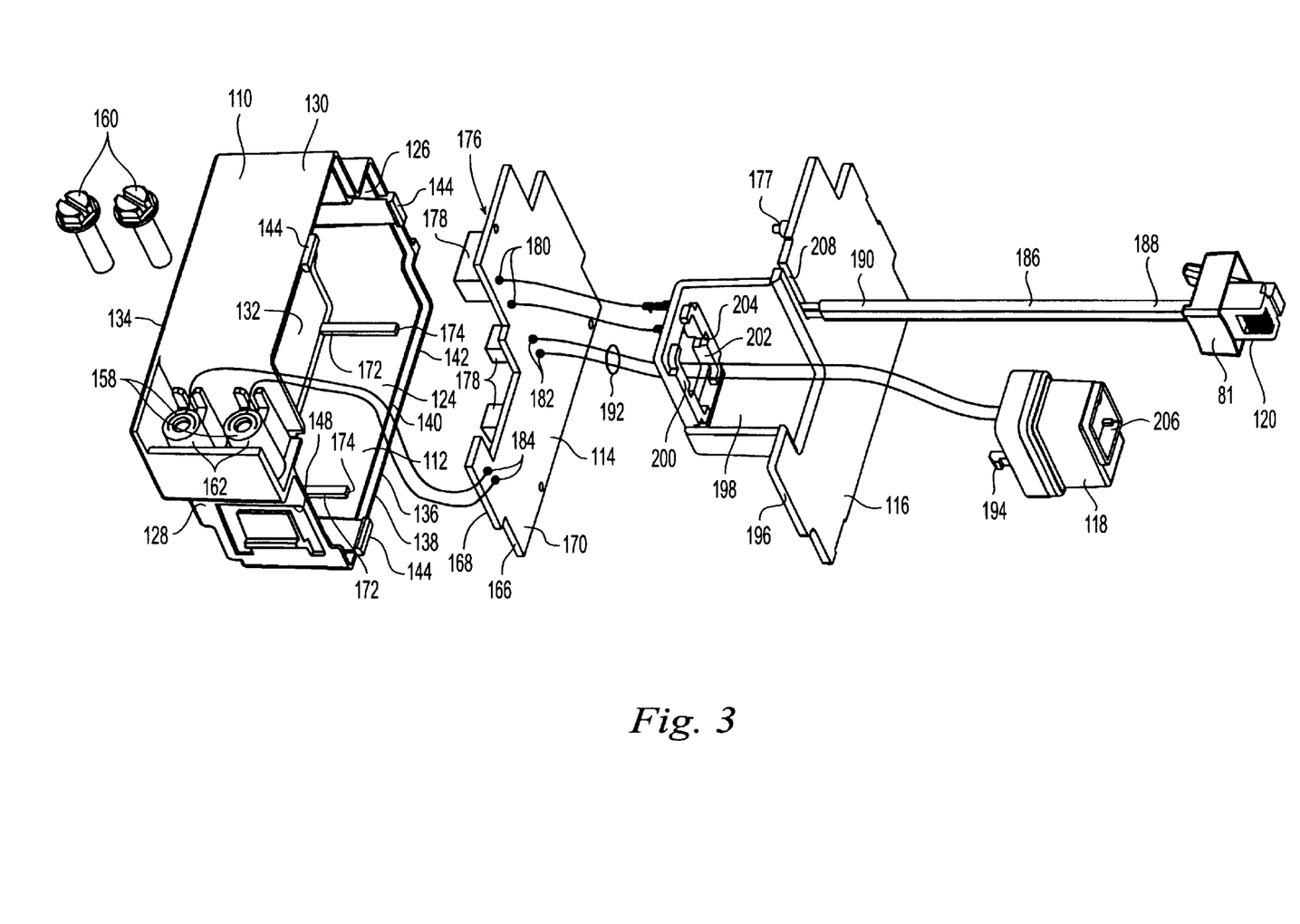
FIG. 3 is an exploded view of a preferred embodiment of the splitter module of the present invention.

Housing 110 carries second terminals 158 which are shown as screws 160 that screw into screw posts 162 for connection of a wire as is known. In the preferred installation, second inside wire pair 72b for carrying the xDSL signal to the subscriber would be terminated at terminals 158. Terminals 158 may be any of a variety of designs, for example, insulation displacement connectors, post and washer, etc.

Circuit card 114 is mounted in housing 110. Circuit card 114 has edge 166, first side 168 toward interior 112 and second side 170 opposite thereto. Edge 166 corresponds at least partially with periphery 138 of housing 110 and housing 110 has ribs 172 with top surface 174 that receive edge 166 disposed thereon such that first side 168 of circuit card 114 is spaced from side wall 132. Circuit card 114 can be secured within housing 110 by any suitable means, for example, by capturing it between top surface 174 and locating pins 177 on cover. Alternatively, circuit card can be secured by ultrasonic welding, screws, snap fit design, or other suitable means. With additional reference to FIG. 6, circuit card 114 carries xDSL splitter circuit 176 that comprises various splitter components 178 mounted on first side 168 so as to be located between side wall 132 and circuit card 114.

Figure 6:
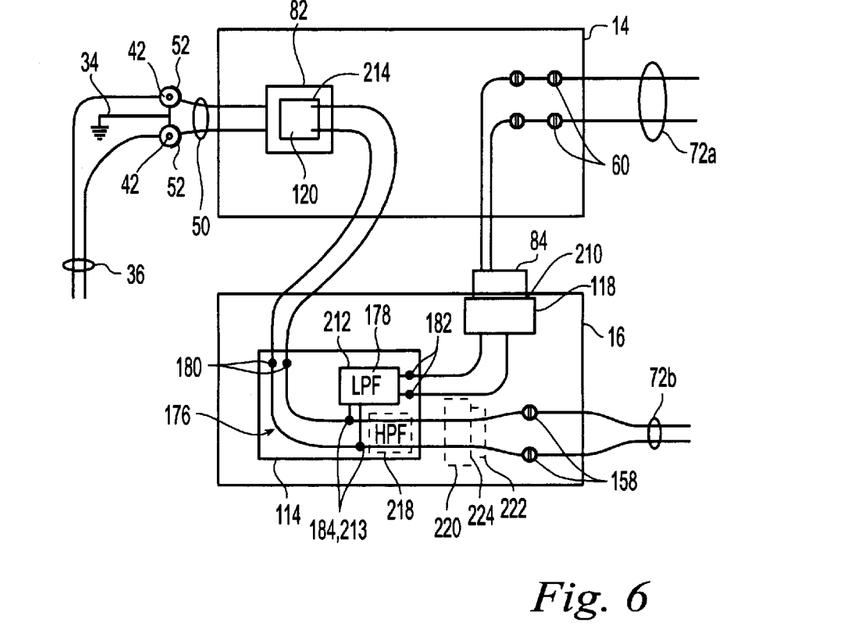
FIG. 6 is a wiring diagram of the preferred embodiment of the splitter module of the present invention interconnected with a POTS module.

First, second and third pair of contacts, 180, 182 and 184 are located on second side 170 and connected through card 114 to circuit 176. Contacts 180, 182 and 184 may be any type of contact, for example, solder points, printed circuit board connectors, etc. Second plug 120 is electrically connected to first pair of contacts 180 by second line cord 186 having first end 188 connected to second plug 120 and second end 190 opposite thereto connected to circuit 176 at first pair of contacts 180. Second plug 120 is preferably an RJ-11 plug that is receivable in first jack 82 on POTS module 14. Second line 186 cord is of sufficient length to allow sufficient freedom of movement of second plug 120 to be inserted into first jack 82.

Second jack 118 is electrically connected to second pair of contacts 182 by leads 192. Alternatively, second jack 118 may be electrically connected to circuit 176 with circuit board connectors. Second jack 118 is preferably an RJ-11 jack that can receive first plug 84 inserted therein.

Second jack 118 is physically mounted to cover 116. Cover 116 has edge 196 that generally corresponds to periphery 138 of housing 110 and that is snap fit between projections 144 and shoulder 140 to close interior 112 of housing 110. Cover 116 defines well 198 with recessed surface 200 that defines opening 202 with notches 204. Latch fingers 194 of second jack 118 snap through notches 204 to secure second jack 118 to recessed surface 200.

Circuit card 114 is shaped to accommodate well 198 extending past circuit card 114 into interior 112.

Second jack 118 has opening 206 that is approximately flush with cover 116 and oriented laterally. Second jack 118 is located such that when splitter module 16 is located adjacent a POTS module 14, opening 206 is accessible to receive first plug 84 therein. Alternatively, second jack 118 may be located where opening 206 is oriented upward, for example, by having second jack mounted on top wall 130. Cover 116 defines slot 208 through which second line cord 186 passes.

With reference to FIGS. 2 and 6, the preferred interconnection of splitter module 16 with POTS module 14 is shown. POTS module 14 is connected to the outside plant wire pair conventionally. The outside plant wire pair carries the combined signal. Splitter module 16 is mounted adjacent to POTS module 14. First plug 84 is removed from first jack 82 and inserted into second jack 118. This creates first demarcation point 210. Second plug 120 is then inserted into first jack 82 which creates second demarcation point 214. First splitter circuit component 212, for example a low pass filter, is connected in series between second jack 118 and second plug 120 and is designed to pass only the first signal, e.g. POTS, of a combined signal from second plug 120 to second jack 118. First pair of inside wires 72a is connected to subscriber terminals 60, or alternatively, these wires may already be connected to subscriber terminals 60 from the original POTS line installation and in such case they are simply left as connected. Second terminals 158 are electrically connected to second plug 120 at third pair of contacts 184 at signal branch point 213 between low pass filter 212 and second plug 120 such that the entire combined signal travels to second terminals 158. Second pair of inside wires 72b is connected to second terminals 158. With this arrangement, first demarcation point 210 provides a test point for the isolated first signal, e.g. POTS, and second demarcation point 214 provides a test point for the combined signal. By having first demarcation point 210, the traditional subscriber access point is retained for the subscriber to perform testing on a phone line as is the traditional use of a POTS demarcation point in NIDs. Second demarcation point is not suitable for such use because a phone plugged in to second demarcation point would most likely pick up other audible signals making it difficult to determine with certainty the location of a fault. However, second demarcation point 214 is also desirable because by disconnecting at this point removes both pairs of inside wires 72a, b from the outside plant for safety purposes. It also allows the xDSL modem to be plugged in to test for signals at that point.

An alternative embodiment adds the dashed components of FIG. 6. Specifically, second splitter circuit component 218, for example a high pass filter, is located in series between signal branch point 213 and second terminals 158 and is designed to pass only the second signal, e.g. xDSL signals, of a combined signal to second terminals 158. Also, third jack 220 and third plug 222 are added in series between second splitter circuit component 218 and second terminals 158 to provide third demarcation point 224 for the isolated second signal, e.g. xDSL. Third demarcation point 224 may be desired to provide a test point for only the xDSL signal should there be some means for the subscriber to test for location of a fault with the xDSL signal that requires the absence of the POTS signal on the xDSL line. Second splitter circuit component 218 may be any other component that exists or may be developed that selectively passes the higher signal. For example, a pair of DC blocking capacitors has been proposed as a possible substitute for a high pass filter.

In the alternative embodiment with the PTD module as depicted in FIG. 7, interconnection can be achieved in at least two ways. First, the housing of splitter module 16 can be adapted to receive door 85 of a PTD POTS module 14' in view of the ease in which door 85 can be removed from the POTS module. If a replacement door is desired for POTS module 14', the second plug can be incorporated into a door that will then be replaced over the top of the POTS module. Alternatively, in view of the submodularity of subscriber bridge 70, the housing of splitter module 16 can be adapted to receive the subscriber bridge from the POTS module which would include the door 85 and first plug 84'. The splitter module would then have second subscriber bridge to connect over the top of the POTS module. Thus, the interconnection of the present invention is not limited to the exchanging of RJ-11 plugs and jacks between the modules but may be achieved by exchanging other detachable portions of the modules to achieve the same goal of incorporating the splitter circuit into the NID.

Although the present invention has been described with respect to a preferred embodiment and certain alternative embodiments, it should be understood that various changes, substitutions and modifications may be suggested to one skilled in the art and its is intended that the present invention encompass such changes, substitutions and modifications as fall within the scope of the appended claims.

That which is claimed is:

1. A network interface device (NID) for providing a point of demarcation for xDSL and POTS signals between an outside plant pair of wires and a first and a second pair of inside wires, comprising:
   (a) a housing having an interior and at least one door that closes over the interior, the interior having a first compartment that is accessible by at least the subscriber and a second compartment to which access by the subscriber is not intended; the first compartment having a plurality of mounting locations;
   (b) a POTS module removably mounted in the housing at a first mounting location of the plurality of mounting locations, the POTS module comprising:
      (i) a first pair of terminals for connection with the outside plant pair of wires;
      (ii) a second pair of terminals for connection with the first pair of inside wires;
      (iii) a first jack electrically connected to the first pair of terminals, and
      (iv) a first plug electrically connected to the second pair of terminals;
   (c) a splitter module removably mounted in the housing at a second mounting location of the plurality of mounting locations, the splitter module comprising:
      (i) a second plug that is removably insertable into the first jack;
      (ii) a second jack having the first plug removably insertable therein; and
      (iii) a first splitter circuit located in series between the second plug and second jack that is designed to pass only the POTS signal from the second plug to the second jack.

2. The device of claim 1 wherein the splitter module further comprises a third pair of terminals electrically connected to a point between the first splitter circuit and the second plug and configured for having the second pair of inside wires connected thereto.

3. The device of claim 2 wherein the splitter module further comprises a second splitter circuit located in series between the third pair of terminals and the second plug, the second splitter circuit designed to pass only the xDSL signal from the second plug to the third pair of terminals.

4. The device of claim 3 wherein the splitter module further comprises a third jack and a third plug inserted therein located in series between the second splitter circuit and the third pair of terminals so as to provide a demarcation point for the xDSL signal.

5. The device of claim 1 wherein the second jack is located on the module such that it opens in a direction toward the POTS module.

6. The device of claim 5 wherein the second jack is located above the top of the POTS module.

7. The device of claim 1 wherein the second plug is connected to the splitter module by a flexible wire pair.

8. The device of claim 1 wherein the housing has a shield that closes over the second compartment and that engages the POTS module to prevent its removal from the housing when the shield is in place and such that the shield must be open to allow mounting of the POTS module in one of the mounting locations.

9. The device of claim 8 wherein the splitter module is configured to be mountable to and removable from one of the mounting locations when the shield is either closed or open.

10. The device of claim 8 wherein the splitter module is configured to be mountable to and removable from one of the mounting locations only when the shield is open such that the splitter module is not removable from the housing when the shield is closed.

11. A method of providing a point of demarcation for xDSL signals and POTS signals between and outside plant pair of wires and first and second pairs of inside subscriber wires in a network interface device (NID) that has at least one POTS module in a first mounting location of a plurality of mounting locations, the POTS module having a first pair of terminals connected to the outside plant pair of wires, a second pair of terminals connected to the first pair of inside wires, and a demarcation point of a first jack with a first plug inserted therein located in series between the first pair of terminals and the second pair of terminals, the method comprising the steps of:
   (a) removably mounting a splitter module at a second of the plurality of mounting locations, the splitter module having a second plug, a second jack and a first splitter circuit located in series between the second plug and the second jack that is designed to pass only the POTS signal from the second plug to the second jack;
   (b) removing the first plug from the first jack; and
   (c) inserting the first plug in the second jack, and inserting the second plug in the first jack.

12. The method of claim 11 further comprising the step of connecting the second pair of inside subscriber wires to the first pair of terminals.

13. The method of claim 11 wherein the splitter module has a third pair of terminals that are electrically connected to a point between the first splitter circuit and the second plug, and further comprising the step of connecting the second pair of inside subscriber wires to the third pair of terminals.

14. A splitter module for installation in a network interface device (NID) that has at least one POTS module in a first mounting location of a plurality of mounting locations, the POTS module having a first pair of terminals, a second pair of terminals, and a demarcation point of a first jack with a first plug inserted therein located in series between the first pair of terminals and the second pair of terminals, the splitter module comprising:
   (a) a housing with an outer configuration for being removably mountable at one of the plurality of mounting locations;

(b) a second plug flexibly extending from the housing such that when the housing is mounted in a mounting location adjacent the first mounting location, the second plug can be inserted into the first jack after the first plug is removed;

(c) a second jack located on the housing such that when the housing is mounted in a mounting location adjacent the first mounting location, the first plug can be removed from the first jack and inserted into the second jack; and (d) a first splitter circuit located in series between the second plug and the second jack, the first splitter circuit designed to pass only the POTS signal from the second plug to the second jack.

15. The module of claim 14 further comprising a third pair of terminals electrically connected to a point between the first splitter circuit and the second plug, the third pair of terminals configured for having the second pair of inside wires connected thereto.

16. A splitter module for installation in a network interface device (NID) that has at least one POTS module in a first mounting location of a plurality of mounting locations, the POTS module having a first pair of terminals, a second pair of terminals, and a demarcation point located in series between the first pair and second pair of terminals, the NID having a shield which is movable between a closed position that engages the POTS module and prevents its removal and an open position where the POTS module can be removed and installed in place, the splitter module comprising:

(a) a housing with an outer configuration that allows it to be installed and removed from one of the plurality of mounting locations while the shield is in the closed position;

(b) a first splitter circuit located in the housing that is designed to pass only POTS signals from a first pair of contacts to a second pair of contacts.

17. The splitter module of claim 16 wherein the outer configuration defines a flexible tang that engages the mounting location and that can be flexed to release the splitter module from the mounting location.

18. A splitter module for selectively passing a first signal from a combined signal having the first signal together with a second signal, the splitter module comprising:

(a) a housing;

(b) a floating RJ-11 plug having a line cord extending therefrom that is connected to the housing;

(c) an RJ-11 jack mounted on the housing; and (d) a first splitter circuit located in the housing and electrically in series between the jack and the plug, the first splitter circuit designed to pass only the first signal to the jack when the combined signal is transmitted through the plug to the first splitter circuit.

19. The splitter module of claim 18 further comprising a pair of terminals mounted on the housing and electrically connected to a point between the plug and the first splitter circuit.

20. The splitter module of claim 19 further comprising a second splitter circuit located in the housing and electrically in series between the point and the pair of terminals, the second splitter circuit designed to pass only the second signal to the pair of terminals when the combined signal is transmitted through the plug to the second splitter circuit.

* * * * *